United States Patent [19]

Hunger et al.

[11] Patent Number: 4,665,163

[45] Date of Patent: May 12, 1987

[54] DIARYL PIGMENTS WITH IMPROVED HEAT STABILITY OBTAINED BY COUPLING BIS-DIAZOTIZED DIAMINES WITH ACETOACETANILIDES

[75] Inventors: Klaus Hunger, Kelkheim; Heinrich Frölich, Niedernhausen; Hans-Joachim Lenz, Hofheim am Taunus, all of Fed. Rep. of Germany

[73] Assignee: Hoechst Aktiengesellschaft, Fed. Rep. of Germany

[21] Appl. No.: 507,711

[22] Filed: Jun. 23, 1983

[30] Foreign Application Priority Data

Jun. 26, 1982 [DE] Fed. Rep. of Germany ....... 3223887

[51] Int. Cl.$^4$ .................... C09B 35/035; C09B 67/20; C09D 11/02; D06P 1/49
[52] U.S. Cl. ..................................... 534/746; 106/23; 106/288 Q; 106/308 Q; 106/309; 534/581; 534/738; 534/742; 534/747
[58] Field of Search ........................... 260/176, 144 P; 106/288 Q, 308 Q; 534/738, 742, 746, 747, 581

[56] References Cited

U.S. PATENT DOCUMENTS 3,405,116 10/1968 Ischer ................................ 260/145
3,529,984 9/1970 Bandel et al. .................. 106/288 Q
3,905,825 9/1975 Gaetani et al. ................. 260/176 X

FOREIGN PATENT DOCUMENTS 921404 12/1954 Fed. Rep. of Germany ...... 260/176
90694 12/1967 France ................................ 534/747
55-89356 7/1980 Japan .................................. 534/747
400418 4/1966 Switzerland ....................... 534/747
1111050 4/1968 United Kingdom ............... 534/747
1111490 4/1968 United Kingdom ............... 534/747

OTHER PUBLICATIONS (Forter et al., II), Chemical Abstracts, 65:9063d (1966).
Toyo II, Chemical Abstracts, 93:206142b (1980).
Funatsu et al., Chemical Abstracts, 89: 112360m (1978).

Primary Examiner—Floyd D. Higel
Attorney, Agent, or Firm—Connolly and Hutz

[57] ABSTRACT

Diaryl pigments having an excellent stability to heat are obtained by carrying out the coupling of bis-diazotized 3,3'-dichloro-4,4'-diaminobiphenyl with acetoacetanilides in the presence of an added quantity of acetoacetanilides which are monosubstituted or disubstituted in the 3-position or 4-position of the nucleus. As a result of their good heat stability, these pigments are particularly suitable for pigmenting plastics having processing temperatures above 200° C.

3 Claims, No Drawings

DIARYL PIGMENTS WITH IMPROVED HEAT STABILITY OBTAINED BY COUPLING BIS-DIAZOTIZED DIAMINES WITH ACETOACETANILIDES

Diaryl pigments which are prepared by coupling bis-diazotized 3,3'-dichloro-4,4'-diaminobiphenyl with acetoacetanilide and which are preferably employed in the printing ink industry are known from German Pat. No. 921,404; they are also of great importance for use in the paint and plastics fields because of their insolubility. When plastics are pigmented, the stability of the pigment towards the effects of heat plays an important part. Depending on the plastic to be pigmented, temperatures above 200° C. are often required. Heat stability means, above all, constancy of tinctorial strength and shade, i.e. neither deepening of the shade (through dissolving or decomposition) nor fading of the shade (for example through recrystallization) must take place at the témperature required.

In most cases, however, diaryl pigments do not have an adequate heat stability and can, therefore, only be employed to a limited extent for coloring some plastics, particularly polyolefins. There has, therefore, been an increasing demand for an improvement in heat stability in order to enable these pigments to be employed universally.

The invention relates to diaryl pigments having an improved heat stability which are obtained by coupling bis-diazotized 3,3'-dichloro-4,4'-diaminobiphenyl with acetoacetanilides of the formula I

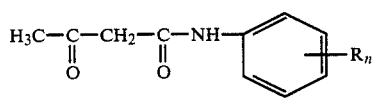
I in which the Rs are identical or different and represent a hydrogen atom, a chlorine atom or a methyl, methoxy or ethoxy group, and n denotes an integer from 1 to 3, and for which the coupling is carried out in the presence of a compound of the formula II

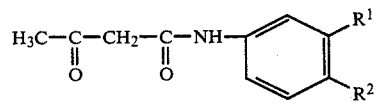
II in which $R^1$ and $R^2$ each denote a radical

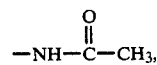

or one of the radicals $R^1$ and $R^2$ denotes a hydrogen atom and the other denotes a radical

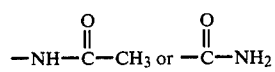

or $-SO_2NH_2$, or $R^1$ and $R^2$ linked to one another denote a divalent radical of the series

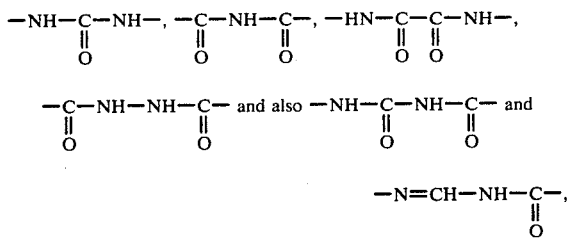

the CO group being attached to the phenyl nucleus either via the 3position or via the 4-position.

The innvention also relates to a process for the preparation of these diaryl pigments.

In general, the compounds of the formula II are employed in an amount of 0.5 to 10 mole %, preferably 1 to 3 mole %, relative to the amount of the coupling component. They are preferably those in which $R^1$ denotes a atom and $R^2$ denotes a radical

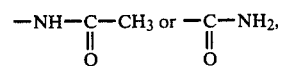

or conversely, or $R^1$ and $R^2$ linked to one another represent a radical of the series

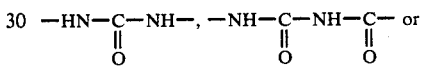

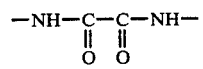

for example 6-acetoacetylaminotetrahydroquinazoline-2,4-dione, 7-aceto acetylaminotetrahydroquinazoline-2,4-dione or 6-aceto acetylaminotetrahydroquinoxaline-2,3-dione; 5-aceto acetylaminobenzimiazolone is particularly preferred.

The acetoacetanilides of the formula I used as the coupling component are preferably acetoaceto-2-methyl anilide, acetoaceto- 2-methyoxyanilide, acetoaceto-4-ethoxyanilide, acetoaceto-2,4-dimethylanilide, aceto aceto-2-methyl-4-chloroanilide, acetoaceto-2-methoxy-5-chloroanilide and acetoaceto-2,4-dimethoxy-5-chloroanilide, but particularly acetoaceto-2,5-dimethoxy-4chloroanilide.

The diazotization of the 3,3'-dichloro-4,4'-di aminobiphenyl is effected in a known manner by means of alkali metal nitrites or lower alkyl nitrites together with adequately strong acids, in particular mineral acids, for example hydrochloric acid or sulfuric acid, but can also be carried out using nitrosylsulfuric acid. In this reaction, and also in the subsequent coupling reaction, it can be beneficial to use added surface-active agents, for exammple non-ionic, anionic or cationic dispersing agents.

Examples of surface-active agents of this type are anionic substances, such as fatty acid taurides, fatty acid N-methyltaurides, fatty acid isothionates, alkylbenzenesulfonates, alkylnaphthalenesulfonates, alkylphenol polyglycol ether-sulfates and fatty alcohol polyglycol ether-sulfates, fatty acids, for example palmitic, stearic and oleic acids, soaps, for example alkali metal salts of fatty acids, naphthenic acids and resin acids, for example abietic acid, alkali-soluble resins, for example colophony-modified maleate resins, cationic substances, such as quaternary ammonium salts, N-oxides of tertiary amines or salts thereof, fatty amines and oxethylated derivatives thereof or non-ionic substances, such as fatty alcohol polyglycol ethers (ethoxylated fatty alcohols), fatty acid polyglycol esters, alkylphenol polyglycol ethers and dialkyl polyglycol ethers.

The surface-active agents can be added individually or as mixtures. The amount can vary within wide limits, in general 0.1 to 20% by weight, preferably 5 to 10% by weight, relative to the pigment, being employed.

The procedure followed before the coupling is advantageously to mix a compound of the general formula II with the coupling component, then to dissolve this mixture, preferably in an aqueous alkali metal hydroxide solution, lastly to re-precipitate it with acid and to carry out the coupling with the resulting suspension.

The diazotization and coupling can also be carried out in the presence of suitable organic solvents, for example glacial acetic acid, lower alkanols, dioxane, formamide, dimethylformamide, dimethyl sulfoxide, pyridine or N-methylpyrrolidone.

It is often advantageous, in order to achieve the full tinctorial strength and a particularly favorable crystal structure, to heat the reaction mixture after the coupling, for example to heat it to reflux temperature for a little time, or to keep it at temperatures above 100° C. under pressure, if appropriate in the presence of organic solvents or in the presence of resin soaps and/or other soluble resins. Particularly pure and readily dispersible pigments are obtained using the products according to the invention if, after the coupling, the moist press cakes or the dried powders are subjected to the thermal aftertreatment mentioned, if appropriate together with organic solvents, or if the pigments are subsequently ground with the addition of grinding auxiliaries.

The preparation of the pigments can also be carried out in the presence of a carrier material, for example barite.

The compounds according to the invention are insoluble in water and in the customary organic solvents, and are suitable for pigmenting printing inks, gloss paints and emulsion paints and for coloring rubber, plastics and natural or synthetic resins. They are particularly suitable for pigmenting plastics, for example polyolefins having processing temperatures above 200° C. and also polyvinyl chloride, polyurethanes, polyacrylonitrile or polydiol dicarboxylates, for example polyglycol terephthalates. They are also suitable for pigment printing on substrates, in particular textile fiber materials or other sheet-like structures, for example paper.

The pigments according to the invention are also suitable for other fields of use, for example for printing and spin-coloring filament viscose or cellulose ethers, cellulose esters, polyamides, polyurethanes, polyglycol terephthalates or polyacrylonitriles, or for coloring paper.

The pigments can be processed readily in the media mentioned. The pigmented substrates have very good fastness to light and, in particular, excellent heat stability and are resistant to the effects of chemicals, above all solvents.

In the following examples parts and percentages relate to weight.

EXAMPLES

1a 50.6 parts of 3,3'-dichloro-4,4'-diaminobiphenyl were stirred in 350 parts by volume of water and 120 parts by volume of 31% strength hydrochloric acid and were then bis-diazotized in the presence of 1.7 parts of an aluminum hydrosilicate at 0–5° C. by rapidly adding 54.6 parts by volume of 40% strength sodium nitrite solution. Stirring was continued and most of the excess nitrite was destroyed.

55.5 parts of 1-acetoacetylamino-2,5-dimethoxy-4-chlorobenzene and 0.48 part of 5-acetoacetylaminobenzimidazolone were dissolved together in 200 parts by volume of water and 22 parts by volume of 33% strength sodium hydroxide solution, and the solution was added, while stirring at about 15° C. to a mixture composed of about 200 parts by volume of water, 18 parts by volume of glacial acetic acid and 10 parts by volume of a 10% strength aqueous solution of a commercially available ethoxylated stearyl alcohol, and was thereby precipitated. A solution of 2.7 parts of a commercially available N-dimethyl-coconut oil amine oxide (the coconut oil radical represents a mixture of alkyl radicals having the following chain distribution: $C_8$ 6%, $C_{10}$ 6%, $C_{12}$ 54%, $C_{14}$ 18%, $C_{16}$ 8% and $C_{18}/C_{18}$ unsaturated 8%) in 6 parts by volume of water was then added to the precipitate obtained. Coupling was carried out by adding half of the clarified bis-diazonium solution dropwise, in the course of 3 hours and at about 20°–25° C., to the initially taken suspension of the coupling component and the additive, the pH value being kept at 4.8, after it had reached this figure, by simultaneously adding dilute sodium hydroxide solution. When the coupling was complete, the suspension of pigment was first warmed to 50° C. and was then rendered alkaline by means of approx. 25 parts by volume of 33% strength sodium hydroxide solution, 2.5 parts of sodium sulfite it is also possible to add a corresponding amount of sodium bisulfite — were added and the temperature was increased further to 96°–98° C. After one hour at this temperature, the mixture was cooled to 70 ° C. by adding water and the pigment was isolated in the form of a press cake, washed with water, dried and ground to give a pigment powder having a reddish-tinged yellow shade.

(1b)

(Comparison)

Example 1a) was repeated, with the modification that 56.06 parts of 1-acetoacetylamino-2,5-dimethoxy-4-chlorobenzene alone were employed as the coupling component in the reaction using the other part of the bisdiazonium solution.

1c)

Test in high density (HD) polyethylene

I. The pigment powder obtained in Example 1a) was mixed in accordance with a standardized process with HD polyethylene powder (density as specified in DIN 53,479: 0.955–0.959, MFI as specified in DIN 53,735: 190/2.16. . . 8 g/10 minutes and 190/5. . .20-26 g/10 minutes), and the mixture was processed, by adding 1% of titanium dioxide in the form of a white preparation in granule form as specified in DIN 53,235, at increasing temperatures, to give injection molded test specimens of the standard depth of color ST 1/3. Pigment 1a) exhibited a markedly better stability when subjected to heat at temperatures of 160° C. to 260° C. than did the similarly processed comparison pigment 1b): relative to the sample 1a) at 180° C. ($\Delta E=0$), the color difference $\Delta E=3$ as specified in DIN 6,174 (CIELAB formula) had not yet been reached for an exposure time of 1 minute or 5 minutes at 260° C. (ie. at this limit of tolerance the heat stability is >260° C.), whereas the comparison pigment 1b) reached the color difference $\Delta E=3$ at as low a temperature as 220° or 210° C. (i.e. its heat stability is only 210°–220° C.). At the same time, the tinctorial strength remained approximately constant up to 260° C. in the case of pigment 1a), whereas the tinctorial strength in the case of the comparison pigment 1b) had decreased by about 30–40% on reaching this temperature.

II. If the pigment 1a) and the comparison pigment 1b) have been processed to give a 40% strength polyethylene wax preparation before being used to color the HD polyethylene, the same values of heat stability are obtained as in test I.

III. The heat stability of the pigment 1a) was also better than that of the comparison pigment 1b) in polypropylene (density as specified in DIN 53,479: 0.905, MFI as specified in DIN 53,735: 190/5. . .3 g/10 minutes, 230/ 2. . .1.5 g/10 minutes, 230/5. . .7 g/10 minutes) at temperatures of 180° to 280° C. Whereas the color difference $\Delta E=3$ for test specimens of polypropylene prepared analogously to I had not yet been reached at 280° C. for an exposure time of 1 minute with pigment 1a), this value was found in the case of comparison pigment 1b) at temperatures as low as 230° C.

2a)

101.2 parts of 3,3′-dichloro-4,4′-diaminobiphenyl were bis-diazotized analogously to Example 1. 168.76 parts of 1-acetoacetylamino-2,4-dimethylbenzene and 3.91 parts of 5-acetoacetylamino-benzimidazolone were dissolved together in 2,000 parts by volume of water and 80 parts by volume of 33% strength sodium hydroxide solution and were then reprecipitated at about 10° C. by means of 57.1 parts by volume of glacial acetic acid, and the pH of the precipitate was adjusted to 5.7 with dilute sodium hydroxide solution.

Coupling was carried out by adding the clarified bis-diazonium salt solution dropwise, in the course of about 2 hours and at about 20° C., to an initially taken mixture of the coupling component and the additive, the pH being kept at 4.5, after this value had been reached, by simultaneously adding dilute sodium hydroxide solution. When the coupling was complete, the temperature was increased and was kept at 96°–98° C. for 1 hour, the mixture was then cooled to 70° C. with water and the pigment was isolated in the form of a press cake, washed with water, dried and ground to give a pigment having a reddish-tinged yellow shade.

2b)

(Comparison)

Example 2 a was repeated, with the modification that 172.2 parts of 1-acetoacetylamino-2,4-dimethylbenzene alone were employed as the coupling component.

2c)

When the pigment powder obtained in accordance with Example 2a) was tested in HD polyethylene (as described under Example 1c, I), this pigment also exhibited a markedly better stability than pigment 2b) when subjected to heat.

|  | Pigment 2 a | Pigment 2 b (Comparison) |
|---|---|---|
| Heat stability (time of exposure 1 minute) | >260° C. | up to 220° C. |

3a)

101.2 parts of 3,3′-dichloro-4,4′-diaminobiphenyl were bis-diazotized as described in Example 1 a and the product was coupled with an analogously precipitated suspension of 236.53 parts of 1-acetoacetylamino-2,5-dimethoxy-4-chlorobenzene and 2.05 parts of 5-acetoacetylamino-benzimidazolone without the addition of the N-dimethyl fatty amine oxide. When coupling was complete, a solution of 73.3 parts of a commercially available resin soap, about 50% strength, was added, the mixture was kept at a temperature of 85° C. for 15 minutes and was treated further as described in Example 1. A pigment having properties as good as those described in Example 1a) was obtained.

3b)

(Comparison)

Example 3 was repeated, with the modification that 238.9 parts of 1-acetoacetylamino-2,5-dimethoxy-4-chlorobenzene alone were employed as the coupling component.

3c)

When the pigment powder obtained in accordance with Example 3a) was tested in HD polyethylene (as described under Example 1c, I), this pigment also exhibited a markedly improved stability when subjected to heat: it was stable at temperatures higher than 260° C. for an exposure of 1 minute and 5 minutes, whereas the comparison pigment was only stable up to 230° C. under these conditions.

|  | Pigment 3 a | Pigment 3 b (Comparison) |
|---|---|---|
| Heat stability Exposure time |  |  |
| 1 minute | >260° C. | up to 230° C. |
| 5 minutes (4 to 20) | >260° C. | up to 230° C. |

In analogous processes 25.3 parts of 3,3′-di-chloro-4,4′-diaminobiphenyl were bis-diazotized and reacted with the quantities of coupling components and additives indicated in the Table below. The resulting pigments 4a)–20a) also had improved heat stability figures when used for coloring HD polyethylene (in accordance with test II, Example 1c), compared with the corresponding pigments 4b)–2b) which had been prepared without using the additive indicated in the Table.

TABLE

| | Coupling component $H_3C-\underset{\underset{O}{\|}}{C}-CH_2-\underset{\underset{O}{\|}}{C}-NH-R$ | | Additive $H_3C-\underset{\underset{O}{\|}}{C}-CH_2-\underset{\underset{O}{\|}}{C}-NH-R'$ | | |
|---|---|---|---|---|---|
| Example | R | Quantity (parts) | R' | Quantity (parts) | Shade |
| 4a | 4-OCH₃, 3-Cl, (OCH₃ also at another position) — dimethoxychlorophenyl | 54,94 | 5-methyl-benzimidazolon-2-yl (H-N—CO—N-H ring fused to methylbenzene) | 0.96 | reddish-tinged yellow |
| 5a | " | 54,38 | " | 1.44 | reddish-tinged yellow |
| 6a | 2,5-dimethylphenyl (H₃C-, -CH₃) | 41,54 | " | 1.71 | reddish-tinged yellow |
| 7a | " | 40,90 | " | 2.45 | reddish-tinged yellow |
| 8a | H₃CO-, -Cl, -OCH₃ substituted phenyl | 54,66 | 4-CONH₂-phenyl | 1.14 | reddish-tinged yellow |
| 9a | " | 54,66 | 4-SO₂NH₂-phenyl | 1.32 | reddish-tinged yellow |
| 10a | 2-methoxyphenyl (H₃CO-) | 42,38 | 5-methyl-benzimidazolon-2-yl | 1.22 | greenish-tinged yellow |
| 11a | H₃CO-, -Cl, -OCH₃ substituted phenyl | 54,66 | 6-methoxy-4-methyl-7-methyl-quinolin-2(1H)-one derivative (H₃CO-, CH₃, N-H, C=O) | 1.48 | reddish-tinged yellow |
| 12a | H₃CO-, -CH₃, -Cl substituted phenyl | 49,37 | 5-methyl-benzimidazolon-2-yl | 0.48 | reddish-tinged yellow |
| 13a | " | 48,87 | " | 0.97 | reddish-tinged yellow |

TABLE-continued

| | Coupling component H₃C—C(=O)—CH₂—C(=O)—NH—R | | Additive H₃C—C(=O)—CH₂—C(=O)—NH—R' | | |
|---|---|---|---|---|---|
| Example | R | Quantity (parts) | R' | Quantity (parts) | Shade |
| 14a | 4-methoxy-2-chloro-phenyl (H₃CO, Cl, OCH₃ substituted phenyl) | 54,66 | 5-methyl-2-(2,4-dioxo-imidazolidin-3-yl)phenyl (benzene with CH₃ and fused hydantoin ring: C(=O)—NH—C(=O)—NH) | 1.35 | reddish-tinged yellow |
| 15a | " | " | 3-methylbenzamide (C(=O)—NH₂ on methylphenyl) | 1.14 | reddish-tinged yellow |
| 16a | " | " | 4-methyl-1,2-bis(acetylamino)phenyl (—NHCOCH₃, —NHCOCH₃) | 1.5 | reddish-tinged yellow |
| 17a | " | " | 4-methylphenyl-NHCOCH₃ | 1.2 | reddish-tinged yellow |
| 18a | " | " | 5-methyl-benzo-fused 4H-3,1-benzoxazin type (C(=O)—NH—CH=N) | 1.27 | reddish-tinged yellow |
| 19a | " | 55,5 | 5-methyl-quinoxaline-2,3-dione (benzene fused with HN—C(=O)—C(=O)—NH) | 0.54 | reddish-tinged yellow |
| 20a | " | 54,66 | 5-methylphthalimide (benzene fused with C(=O)—NH—C(=O)) | 1.27 | reddish-tinged yellow |

We claim:

1. A diaryl pigment obtained by coupling bis-diazotized 3,3'-dichloro-4,4'-diaminobiphenyl with an acetoacetanilide of the formula I

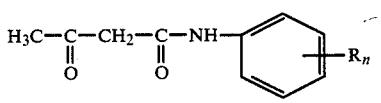

I in which
the Rs are identical or different and each of the Rs represents a member selected from the group consisting of hydrogen, chlorine, methyl, methoxy and ethoxy, and
n denotes an interger from 1 to 3,
the coupling being carried out in the presence of about 1 to 3 mole %, relative to said acetoacetanilide of formula I of a component consisting essentially of a compound of the formula II

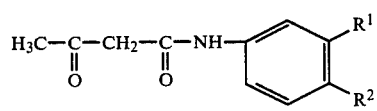

II in which R¹ and r² each denote the radical

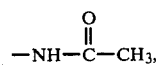

$$-NH-\overset{O}{\underset{\|}{C}}-CH_3,$$

or one of the radicals $R^1$ and $R^2$ denotes hydrogen and the other denotes a radical selected from the group consisting of

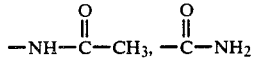

and $-SO_2NH_2$, or $R^1$ and $R^2$ linked to one another denote a divalent radical selected from the group consisting of

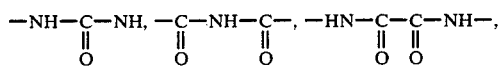

-continued

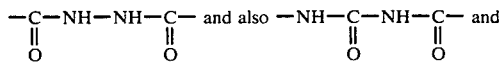

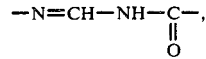

the CO group being attached to the phenyl nucleus either via the 3-position or via the 4-position.

2. A diaryl pigment as claimed in claim 1, wherein 5-acetoacetylamino-benzimidazolone is the composed of the formula II.

3. A diaryl pigment as claimed in claim 1 wherein acetoacetylamino-2,5-dimethoxy-4-chlorobenzene is the acetoacetanilide of the formula I.

* * * * *